(12) United States Patent
Bhogal et al.

(10) Patent No.: US 8,266,314 B2
(45) Date of Patent: Sep. 11, 2012

(54) AUTOMATED AUDIO OR VIDEO SUBSET NETWORK LOAD REDUCTION

(75) Inventors: Kulvir S. Bhogal, Pflugerville, TX (US); William A. Griffith, Austin, TX (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/639,366

(22) Filed: Dec. 16, 2009

(65) Prior Publication Data

US 2011/0145708 A1    Jun. 16, 2011

(51) Int. Cl.
*G06F 13/00* (2006.01)
(52) U.S. Cl. .................. 709/231; 709/219; 709/224
(58) Field of Classification Search .................. 709/217, 709/219, 223, 224, 230, 231
See application file for complete search history.

(56) References Cited

U.S. PATENT DOCUMENTS

| | | | |
|---|---|---|---|
| 4,823,108 A | 4/1989 | Pope | |
| 5,541,662 A | 7/1996 | Adams et al. | |
| 5,550,863 A | 8/1996 | Yurt et al. | |
| 6,014,706 A | 1/2000 | Cannon et al. | |
| 6,340,992 B1 | 1/2002 | Markandey | |
| 6,959,045 B2 | 10/2005 | Hurst, Jr. | |
| 7,369,137 B2 | 5/2008 | Lopez et al. | |
| 7,519,667 B1 * | 4/2009 | Capps | 709/206 |
| 7,716,232 B2 | 5/2010 | Glenn | |
| 2005/0102371 A1 | 5/2005 | Aksu | |
| 2006/0114884 A1 | 6/2006 | Remaker | |
| 2006/0225106 A1 | 10/2006 | Bedingfield, Sr. | |
| 2008/0010347 A1 | 1/2008 | Houghton et al. | |
| 2008/0291265 A1 | 11/2008 | Wagner et al. | |
| 2009/0064252 A1 | 3/2009 | Howarter et al. | |

FOREIGN PATENT DOCUMENTS

| WO | 2007/026269 A1 | 8/2007 |
|---|---|---|
| WO | 2007/138429 A2 | 12/2007 |

OTHER PUBLICATIONS

Aditya Mavlankar, David Varodayan, Region-of-Interest Prediction for Interactively Streaming Regions of High Resolution Video, Article, EE392J Group Project Report, Dec. 2007, pp. 1-13, Information Systems Laboratory, Stanford University, Stanford, CA.

Author Unknown, eyevis Perfect Visual Solutions: The Intelligent Software Solution for Perfect Control of Your Large Screen System, Product Brochure/Offering, 2010, pp. 1-4, eyevis GmbH, Reutlingen, Germany.

Author Unknown, harmonic ProStream 8000: Application Note, Product Brochure/Offering, Jun. 2009, pp. 1-8, Harmonic Inc., Sunnyvale, CA.

* cited by examiner

*Primary Examiner* — Viet Vu
(74) *Attorney, Agent, or Firm* — Lee Law, PLLC; Christopher B. Lee

(57) ABSTRACT

A multimedia data stream including an audio data stream and a video data stream is received from a server at a computing device. An audio output signal for the audio data stream and a video output signal for the video data stream are generated. A user interface action that blocks output of one of the audio data stream and the video data stream is detected via the computing device. A multimedia traffic reduction request is sent to the server instructing the server to stop transmission of a portion of the multimedia data stream associated with the blocked output of one of the audio data stream and the video data stream.

14 Claims, 4 Drawing Sheets

AUTOMATED AUDIO OR VIDEO SUBSET NETWORK LOAD REDUCTION

BACKGROUND

The present invention relates to multimedia audio and video network content. More particularly, the present invention relates to automated audio or video subset network load reduction.

Computing devices may access servers and other storage devices to receive audio and video content. The audio and video content is often interleaved or otherwise combined into a single networked multimedia data stream.

BRIEF SUMMARY

A method includes receiving, at a computing device, a multimedia data stream comprising an audio data stream and a video data stream from a server; generating an audio output signal for the audio data stream and a video output signal for the video data stream; detecting, via the computing device, a user interface action that blocks output of one of the audio data stream and the video data stream; and sending a multimedia traffic reduction request to the server instructing the server to stop transmission of a portion of the multimedia data stream associated with the blocked output of the one of the audio data stream and the video data stream.

An alternative method includes receiving, at a computing device, a multimedia data stream comprising an audio data stream and a video data stream from a server; generating an audio output signal for the audio data stream and a video output signal for the video data stream; detecting, via the computing device, a user interface action that blocks output of the video data stream; and sending a multimedia traffic reduction request to the server instructing the server to stop transmission of a portion of the multimedia data stream associated with the blocked output of the video data stream.

Another alternative method includes receiving, at a server computing device, a multimedia traffic reduction message requesting termination of transmission of one of an audio data stream portion and a video data stream portion of a multimedia data stream transmitted from the server computing device; and transmitting, in response to the multimedia traffic reduction message, a remainder of the multimedia data stream comprising the multimedia data stream without the one of the audio data stream portion and the video data stream portion associated with the multimedia traffic reduction message.

A computer program product includes a computer readable storage medium including computer readable program code, wherein the computer readable program code when executed on a computer causes the computer to: receive a multimedia data stream comprising an audio data stream and a video data stream from a server; generate an audio output signal for the audio data stream and a video output signal for the video data stream; detect a user interface action that blocks output of one of the audio data stream and the video data stream; and send a multimedia traffic reduction request to the server instructing the server to stop transmission of a portion of the multimedia data stream associated with the blocked output of the one of the audio data stream and the video data stream.

DETAILED DESCRIPTION

Figure 1:
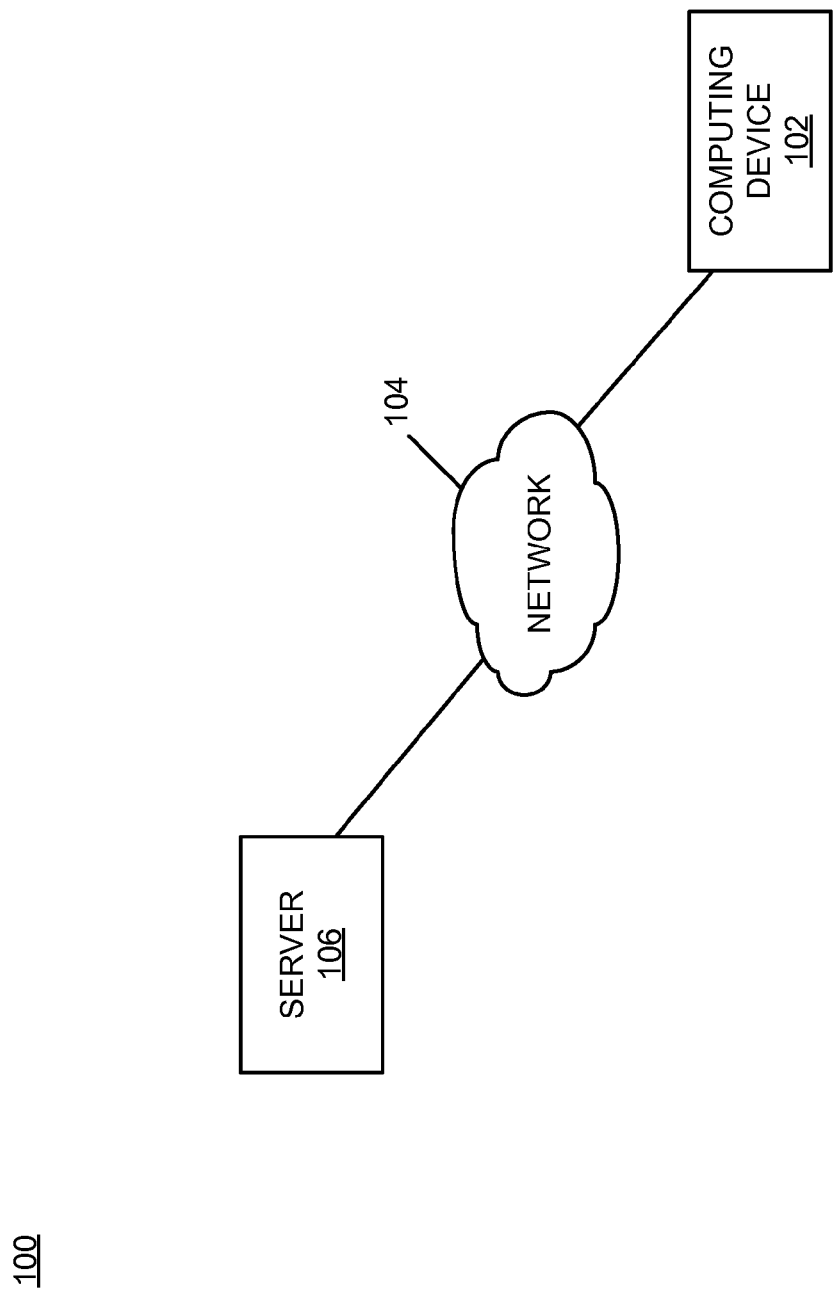
FIG. 1 is a block diagram of an example of an implementation of a system for automated audio or video subset network load reduction according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated audio or video subset network load reduction. A multimedia data stream received from a server at a computing device may include an audio data stream and a video data stream. The audio data stream is output via an audio output device and the video data stream is output via a display device. A user interface action that blocks output of one of the audio data stream and the video data stream is detected by the computing device. However, the server is still sending both audio and video portions of the multimedia data stream to the computing device while a portion of the audio and video data is blocked. In response to detection of the blocked output, a multimedia traffic reduction request (e.g., a multimedia traffic reduction message) is sent to the server instructing the server to stop transmission of a portion of the multimedia data stream associated with the blocked output portion of the multimedia data stream (e.g., one of the audio data stream and the video data stream) to initiate automated audio or video subset network load reduction.

In response to the multimedia traffic reduction request, a subset of the multimedia data stream including only the portion of the multimedia data stream for which output is not blocked is transmitted by and received from the server and network load reduction may be achieved. As such, an unblocked subset of the multimedia data stream other than the portion of the multimedia data stream associated with the blocked output of the audio data stream or the blocked output of the video data stream is received by the computing device. Only the unblocked subset of the multimedia data stream is output by the computing device.

Detecting the user interface action that blocks output of the one of the audio data stream and the video data stream may include detecting a user interface action associated with placement of a graphical user interface (GUI) application window over the output of the video data stream on the display. Placement of the GUI application window over the output of the video data stream may change user interface focus to the GUI application window that blocks the output of the video data stream. For example, a user may have a meeting reminder pop up causing focus of a graphical user interface (GUI) to change and cover a video data stream, such as a news feed, that is currently being displayed. Detecting the user interface action that blocks output of the one of the audio data stream and the video data stream may also include detecting a user interface action associated with a mute request that blocks the output of the audio data stream. For example, a selection of a mute option or a mute button, whether a physical input mute button or a GUI mute button, associated with an audio output device by a user may be detected. Detecting the user interface action that blocks output of the one of the audio data stream and the video data stream may further include detecting, via a light sensor, that one of the audio output device and the video output device of the computing device is covered. As such, a portable device may determine, based upon a light sensor on the device, that the device is covered (e.g., output is blocked), such as in a pocket of a user, and send a multimedia traffic reduction request to a server to stop streaming of multimedia content. Many other possibilities exist for detection of user interface actions that block output of a portion of a multimedia data stream received from a server by a computing device and all are considered within the scope of the present subject matter.

A use event associated with the blocked output of the audio data stream or the blocked output of the video data stream may be detected. For example, a use event may include a focus changing back to the news feed or detection of an un-mute option selection by a user associated with the audio output device. In response to detecting the use event, the computing device may send a multimedia traffic increase request (e.g., a multimedia traffic increase message) to the server instructing the server to begin transmission of the portion of the multimedia data stream associated with the blocked output of the audio data stream or the blocked output of the video data stream. In response to the multimedia traffic increase request, the multimedia data stream including the portion for which the output was previously blocked is transmitted by and received from the server. The computing device may receive the multimedia data stream including both the audio data stream and the video data stream in response to the multimedia traffic increase request and may restart output of the blocked output of the audio data stream or the blocked output of the video data stream.

A multimedia traffic reduction option may be configured and may be automatically enabled based upon one of a configured time threshold for blocked output. As such, blocked content may be stopped from being transmitted (e.g., filtered) by the server after a configured time to provide hysteresis to the automated audio or video subset network load reduction. As another example, a configured processor load threshold associated with the computing device may be used to automatically enable a multimedia traffic reduction option. As such, when processor load is higher, such as where response from an application is slow, the automated audio or video subset network load reduction may be automatically initiated to reduce bandwidth processing requirements by automatically toggling transmission of portions of the multimedia data stream upon recognizing a covered window. In any such situation, the multimedia traffic reduction request sent to the server may be performed in response to determining that the multimedia traffic reduction option is enabled. Many other possibilities exist for enabling and disabling a multimedia traffic reduction option for a computing device and all are considered within the scope of the present subject matter.

It should also be noted that a user may be prompted with a request to confirm that the automated audio or video subset network load reduction should be carried out. This prompting may further assist in reducing processing overhead for blocked content events that are temporary in nature. In such an implementation, in response to detection of the user interface action that blocks the output of one of the audio data stream and the video data stream, a user may be prompted with an inquiry for reduction of the multimedia data stream. The prompting may occur either visually via a display or audibly via an audio output device, or via any prompting approach appropriate for a given implementation. A user input may be detected, in response to the prompt, instructing the computing device to reduce the multimedia data stream or not to reduce the multimedia data stream. In response to detecting an instruction to reduce the multimedia data stream, the automated audio or video subset network load reduction may continue to reduce network load by requesting the server to stop sending the portion of the blocked output of the multimedia data stream.

As such, in response to detection of the user interface action, the computing device initiates the automated audio or video subset network load reduction, as described above and in more detail below. Network bandwidth waste and wasted CPU cycles may be reduced by filtering video data from streams when a streaming application's user interface is, for example, covered by other non-transparent applications, or by filtering audio data from streams when audio output is, for example, muted.

A multimedia traffic reduction request may include a message with one of a "NOVIDEO" command and a "NOAUDIO" command, based upon which output of the video portion and the audio portion of the multimedia data stream is blocked, respectively. A multimedia traffic increase request may include a message with one of a "VIDEONOW" command and an "AUDIONOW" command, based upon which output of the video portion and the audio portion of the multimedia data stream is no longer blocked, respectively. The respective messages may be sent to the server via any messaging interface and protocol appropriate for a given implementation.

As such, to implement the automated video subset network load reduction portion of the present subject matter, a computing device may subscribe to system events, such as a Window.Covered event, provided by a desktop manager of the operating system. When a computing device detects that an application is completely covered by another program by detection of such a system event and that covered program is receiving a video data stream, the computing device may intercept the video data stream and cause a NOVIDEO command to be sent to the server. The server will process the received message and identify the NOVIDEO command from the computing device. When a NOVIDEO command is received, the server filters the video portion of the multimedia data stream from the outgoing data feed. When the computing device detects that a covered window that has a video data stream associated with it becomes uncovered, the computing device sends a VIDEONOW command to the server to continue the multimedia feed with the video portion included.

Further, to implement the automated audio subset network load reduction portion of the present subject matter, a computing device may subscribe to Mute events provided by a desktop manager of the operating system. When a Mute event is detected, the computing device intercepts the audio data stream and causes a NOAUDIO command to be sent to the server. The server will process the received message and identify the NOAUDIO command from the computing device. When the NOAUDIO command is received, the server filters the audio portion of the multimedia data stream from the outgoing data feed. When the computing device detects an Unmute event has occurred, the computing device sends an AUDIONOW command to the server to continue the multimedia feed with the audio portion included.

It should further be noted that the present subject matter may also be applied to situations where a user interface event is associated with a detected request to stop a portion of a multimedia data stream. As such, toggling of data stream reception may be implemented in association with detection of user interface requests associated with data stream reception. For example, when the computing device detects a user interface request to stop either a video portion or an audio portion of a multimedia data stream, the computing device may send a request to the server indicating to stop transmission of the requested portion of the multimedia data stream. For example, a user may wish to pause an audio output of a multimedia feed to receive a telephone call, but continue the video data stream portion during the call. To provide for such situations, the present subject matter includes the above-described toggle functionality to allow a user to request the computing device to toggle transmission of a portion of a multimedia data stream received from a server.

Further, the present subject matter may be applied to each user interface application independently to allow each application to separately stop and start transmission of portions of the multimedia data streams. This may provide cost benefits in a cost-per-kilobyte environment. As such, a user may be able to manage and cut cost if audio and video associated with multimedia data streams are decoupled as described herein. If download caps exist in a given environment or if usage charges apply to a given environment, the user may configure the computing device to automatically conserve costs by utilizing the automated audio or video subset network load reduction described herein.

Toggling, as described above, may also be implemented, in situations where the computing device determines that a window is covered most of the time. When a window is covered most of the time, the computing device may prompt a user and indicate that the window is covered and burning bandwidth. Further, the intelligent toggling may be based upon time frames for blocked output (e.g., five minutes) and may be configured to toggle off a portion of the multimedia data stream after the configured time frame. Preferences may be configured for turning on or off the automated audio or video subset network load reduction. The preferences may be based upon user-configurable options to turn on or off the automated audio or video subset network load reduction for given processor load values, configured time frames, and other criteria. Many other possibilities exist for the automated audio or video subset network load reduction described herein and all are considered within the scope of the present subject matter.

The automated audio or video subset network load reduction described herein may be performed in real time to allow a prompt request for a reduction in received content when either an output of an audio or a video portion of received content is not presently provided on an output device. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated audio or video subset network load reduction. A computing device 102 communicates via a network 104 with a server 106.

As will be described in more detail below in association with FIG. 2 through FIG. 4, the computing device 102 provides automated audio or video subset network load reduction. The automated audio or video subset network load reduction is based upon detection of user interface actions that block output of one of an audio portion and a video portion of a multimedia data stream output by the computing device. The automated audio or video subset network load reduction requests a server to stop transmission of a portion of the multimedia data stream in response to detection of the blocked output, and requests continued transmission in response to detecting that the output is no longer blocked.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
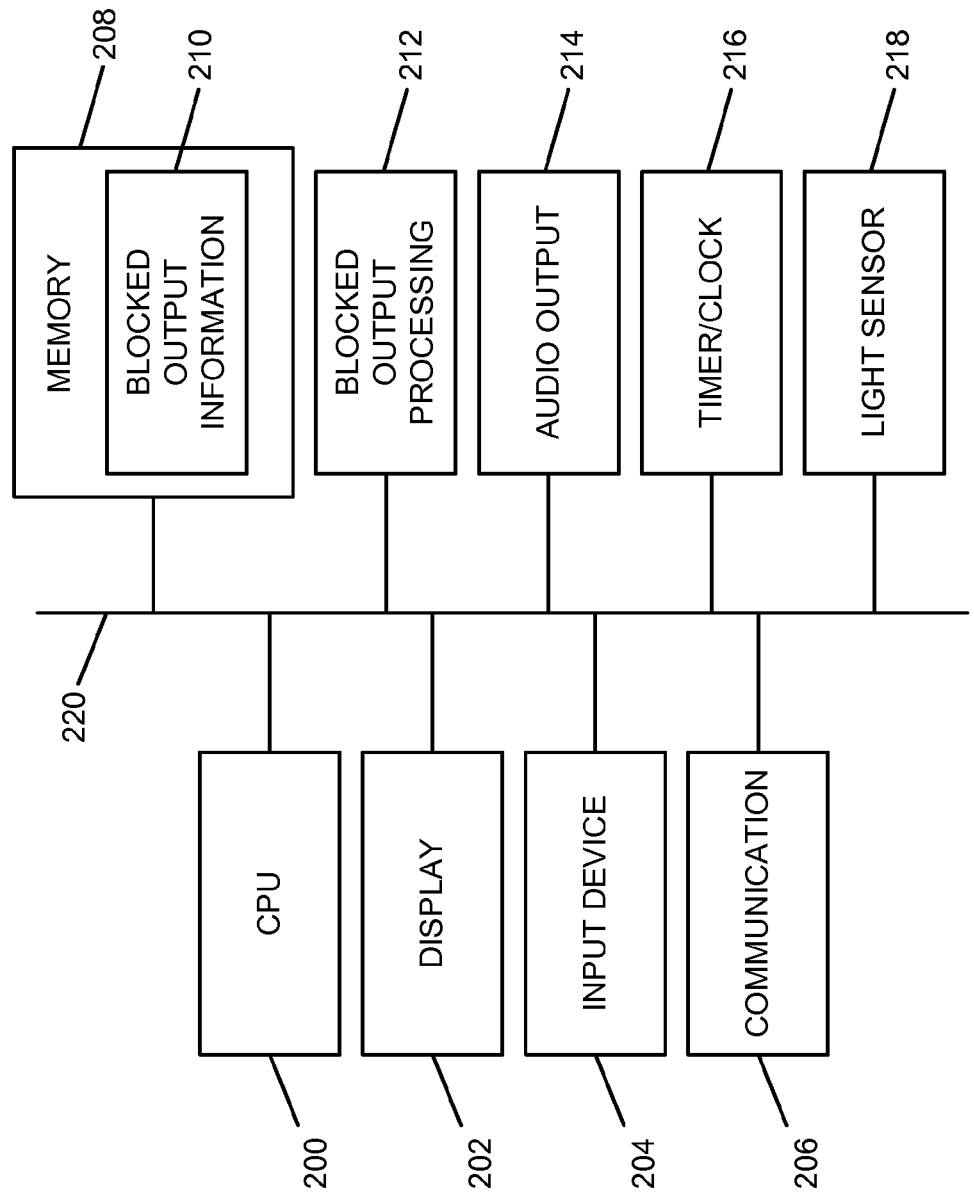
FIG. 2 is a block diagram of an example of an implementation of a computing device capable of performing automated audio or video subset network load reduction according to an embodiment of the present subject matter.

FIG. 2 is a block diagram of an example of an implementation of the computing device 102 capable of performing automated audio or video subset network load reduction. A central processing unit (CPU) 200 provides computer instruction execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device 102 to communicate with other modules within the system 100, such as the server 106, to control transmission of portions of a multimedia data stream transmitted by the server 106 to the computing device 102. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a blocked output information storage area 210 that stores user interface action information, configuration information, and preferences for processing of multimedia data streams by the computing device 102. As will be described in more detail below, blocked output information stored within the blocked output information storage area 210 is used to determine whether output of either an audio or a video portion of a multimedia data stream is blocked and whether to request termination or a restart of transmission of a portion of a multimedia data stream by a server. These determinations may further be based upon configuration information stored in the blocked output information storage area 210.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A blocked output processing module 212 is also illustrated. The blocked output processing module 212 provides processing capabilities for blocked output events for the computing device 102, as described above and in more detail below. The blocked output processing module 212 implements the automated audio or video subset network load reduction of the computing device 102.

Though the blocked output processing module 212 is illustrated as a component-level module for ease of illustration and description purposes, it should be noted that the blocked output processing module 212 may include any hardware, programmed processor(s), and memory used to carry out the functions of this module as described above and in more detail below. For example, the blocked output processing module 212 may include additional controller circuitry in the form of application specific integrated circuits (ASICs), processors, and/or discrete integrated circuits and components for performing communication and electrical control activities associated with the respective devices. Additionally, the blocked output processing module 212 may also include interrupt-level, stack-level, and application-level modules as appropriate. Furthermore, the blocked output processing module 212 may include any memory components used for storage, execution, and data processing for performing processing activities associated with the module.

It should also be noted that the blocked output processing module 212 may form a portion of other circuitry described without departure from the scope of the present subject matter. Further, the blocked output processing module 212 may alternatively be implemented as an application stored within the memory 208. In such an implementation, the blocked output processing module 212 may include instructions executed by the CPU 200 for performing the functionality described herein. The CPU 200 may execute these instructions to provide the processing capabilities described above and in more detail below for the computing device 102. The blocked output processing module 212 may form a portion of an interrupt service routine (ISR), a portion of an operating system, a portion of a browser application, or a portion of a separate application without departure from the scope of the present subject matter.

An audio output module 214 provides output capabilities for the computing device 102. The audio output module 214 may include driver and other circuitry for interfacing with a speaker (not shown) or other output device.

A timer/clock module 216 is illustrated and used to determine timing and date information, such as a duration of blocked output for a portion of a multimedia data stream, as described above and in more detail below. As such, the blocked output processing module 212 may utilize information derived from the timer/clock module 216 for information processing activities, such as the automated audio or video subset network load reduction.

A light sensor 218 senses light. The computing device 102 may utilize the light sensor 218 to determine whether the computing device 102 is covered. For example, for a portable implementation of the computing device 102, as described above, the light sensor 218 may be used to detect that a user has placed the computing device 102 within a pocket, brief case, or other area where video or audio output may not be accessible to the user.

The CPU 200, the display 202, the input device 204, the communication module 206, the memory 208, the blocked output processing module 212, the audio output module 214, the timer/clock module 216, and the light sensor 218 are interconnected via an interconnection 220. The interconnection 220 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device 102 are possible and all are considered within the scope of the present subject matter. Accordingly, the computing device 102 may take many forms and may be associated with many platforms.

Figure 3:
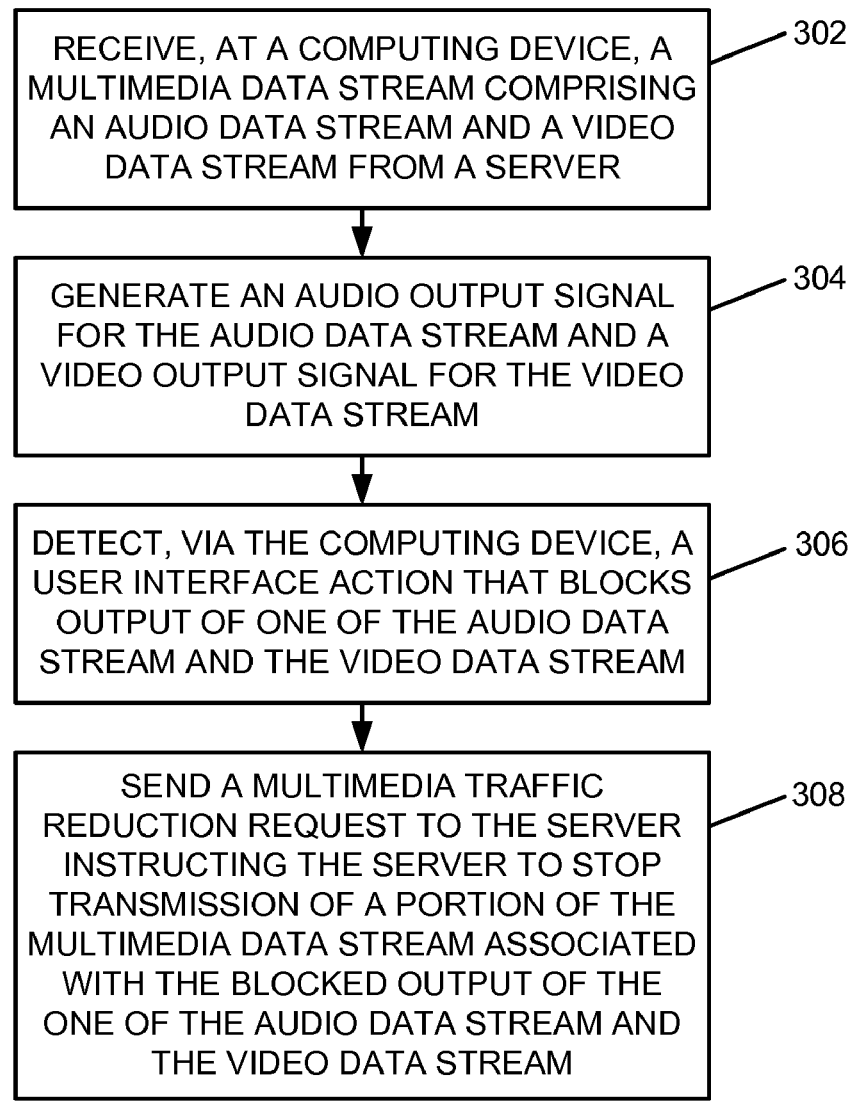
FIG. 3 is a flow chart of an example of an implementation of a process for automated audio or video subset network load reduction according to an embodiment of the present subject matter.
Figure 4:
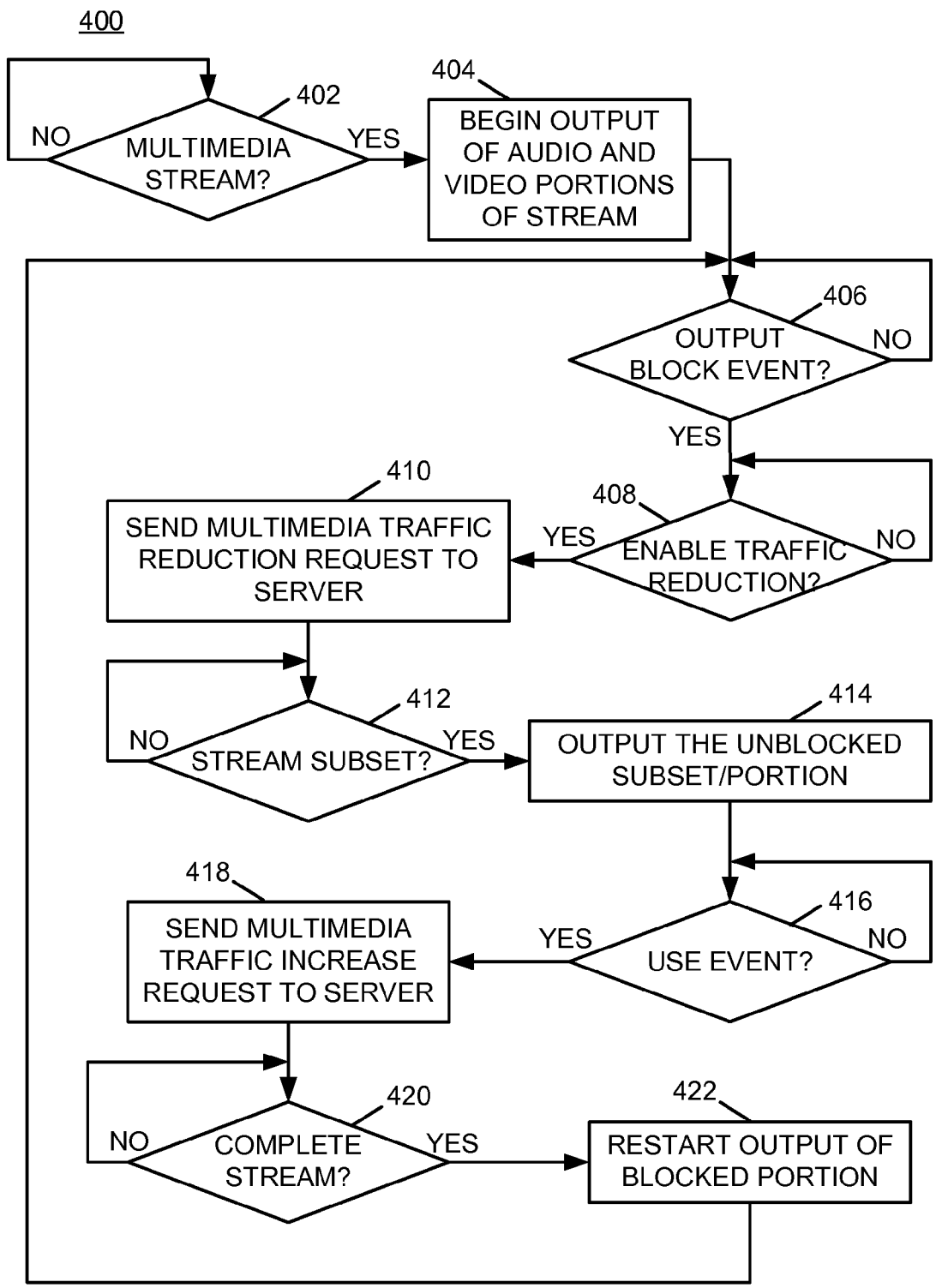
FIG. 4 is a flow chart of an example of an implementation of a process for automated audio or video subset network load reduction according to an embodiment of the present subject matter.

FIG. 3 through FIG. 4 below describe example processes that may be executed by devices, such as the computing device 102, to perform the automated audio or video subset network load reduction associated with the present subject matter. Many other variations on the example processes are possible and all are considered within the scope of the present subject matter. The example processes may be performed by modules, such as the blocked output processing module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated audio or video subset network load reduction. At block 302, the process 300 receives, at a computing device, a multimedia data stream comprising an audio data stream and a video data stream from a server. At block 304, the process 300 generates an audio output signal for the audio data stream and a video output signal for the video data stream. At block 306, the process 300 detects, via the computing device, a user interface action that blocks output of one of the audio data stream and the video data stream. At block 308, the process 300 sends a multimedia traffic reduction request to the server instructing the server to stop transmission of a portion of the multimedia data stream associated with the blocked output of the one of the audio data stream and the video data stream.

FIG. 4 is a flow chart of an example of an implementation of a process 400 for automated audio or video subset network load reduction. At decision point 402, the process 400 makes a determination as to whether to receive a multimedia data stream, including an audio data stream and a video data stream, from a server. At block 404, the process 400 begins output of the audio data stream via an audio output device, such as the audio output module 214, and the video data stream via a display device, such as the display 202, associated with the computing device.

At decision point 406, the process 400 makes a determination as to whether an output block event has been detected. For example, as described above, a user interface action that blocks output of one of the audio data stream and the video data stream may be detected. Regarding blockage of output of the video data stream, a user may, for example, have a meeting reminder pop up causing focus of a graphical user interface (GUI) to change and cover a news feed that is currently displayed. As such, the process 400 may detect that a user interface action associated with placement of a GUI application window over the output of the video data stream on the display that blocks the output of the video data stream has occurred. Regarding blockage of output of the audio data stream, a selection of a mute option or a mute button, whether a physical input mute button or a GUI mute button, associated with an audio output device, such as the audio output module 214, by a user may be detected. As such, the process 400 may detect that a user interface action associated with a mute request that blocks the output of the audio data stream has occurred. Additionally, regarding either the audio data stream or the video data stream, an event associated with a light sensor, such as the light sensor 218, may be used to detect that the computing device 102 is covered and that output of either portion of the multimedia data stream is blocked. As such, the process 400 may detect that one of the audio output device and the video output device of the computing device is covered.

When a determination is made at decision point 406 that a content block event has been detected, the process 400 makes a determination at decision point 408 as to whether to enable network traffic/load reduction. For example, network traffic/load reduction may be enabled by default and, thus, processing at decision point 408 may result in an affirmative determination immediately. Alternatively, network traffic/load reduction may include automatically enabling a multimedia traffic reduction option based upon a configured time threshold for blocked output, such as via use of the timer/clock module 216. Network traffic reduction may include automatically enabling a multimedia traffic reduction option based upon a configured processor load threshold associated with the computing device, such as a processor load over fifty percent (50%). Further, network traffic reduction may include automatically enabling a multimedia traffic reduction option in response to prompting a user with an inquiry for reduction of the multimedia data stream and detecting user input instructing the computing device 102 to reduce the multimedia data stream. Many other options are possible for enabling network traffic/load reduction and all are considered within the scope of the present subject matter.

When a determination is made at decision point 408 to enable network traffic/load reduction, the process 400 sends a multimedia traffic reduction request to a server, such as the server 106, instructing the server to stop transmission of a portion of the multimedia data stream associated with the blocked output of one of the audio data stream and the video data stream at block 410. The multimedia traffic reduction request may include a message sent to the server including an instruction to stop transmission of the blocked portion of the output of the multimedia data stream. As described above, the message may include a multimedia traffic reduction request including one of a NOAUDIO command and a NOVIDEO command to stop transmission of the audio data stream and the video data stream, respectively, from the server. In response to receipt of the multimedia traffic reduction request message, the server may stop transmitting the entire multimedia data stream and begin transmitting a remainder of the multimedia data stream including the multimedia data stream without the one of the audio data stream portion and the video data stream portion associated with the multimedia traffic reduction message.

The process 400 may further terminate output of received multimedia content associated with the blocked output or may continue providing output until the server responds with a subset of the multimedia data stream including all data stream portions other than the data stream portion associated with the blocked output.

At decision point 412, the process 400 makes a determination as to whether a stream subset, including all data stream portions other than the data stream portion associated with the blocked output, has begun being received from the server. As such, the process 400 may receive, in response to the multimedia traffic reduction request, a subset of the multimedia data stream including only an unblocked subset/portion of the multimedia data stream other than the portion of the multimedia data stream associated with the blocked output of one of the audio data stream and the video data stream. The unblocked subset/portion of the multimedia data stream may include either the audio data stream or the video data stream within the present example.

The process 400 outputs the unblocked subset/portion of multimedia data stream at block 414. At decision point 416, the process 400 makes a determination as to whether a use event associated with the blocked one of the audio data stream and the video data stream has been detected. As described above, a use event may include, for example, a focus event associated with a news feed in response to detection of a user interaction with an application window associated with the news feed that uncovers the news feed application window for video output. Alternatively, a use event may include, for example, detection of an un-mute selection associated with a mute option for audio output.

When a determination is made at decision point 416 that a use event associated with the blocked output of one of the audio data stream and the video data stream has been detected, the process 400 sends a multimedia traffic increase request to the server instructing the server to begin transmission of the portion of the multimedia data stream associated with the blocked output of one of the audio data stream and the video data stream at block 418. The multimedia traffic increase request may include a message with one of an AUDIONOW command and a VIDEONOW command to instruct the server to begin sending the portion of the multimedia data stream of the previously-blocked output of one of the audio data stream and the video data stream, respectively. In response to receipt of the multimedia traffic increase request message, the server may begin transmitting the multimedia data stream comprising both of the audio data stream portion and the video data stream portion.

At decision point 420, the process 400 makes a determination as to whether the multimedia data stream, including the previously blocked one of the audio data stream and the video data stream, has begun being received. As such, the process 400 may receive, in response to the multimedia traffic increase request, the multimedia data stream comprising both of the audio data stream and the video data stream. When a determination is made that the full multimedia data stream, including the previously blocked one of the audio data stream and the video data stream, has begun being received, the process 400 restarts output of the blocked one of the audio data stream and the video data stream at block 422 and returns to decision point 406 to determine whether a block event has been detected and iterates as described above.

As such, the process 400 provides automated audio or video subset network load reduction in response to detections of block events associated with output of a portion of a multimedia data stream. The process 400 sends multimedia traffic reduction requests to a server instructing the server to filter the blocked output portion of the multimedia data stream from the feed received by a device executing the process 400. The process 400 also detects use events associated with the blocked output of content and instructs the server via a multimedia traffic increase request to begin sending the previously-blocked portion of the output of the multimedia data stream again.

As described above in association with FIG. 1 through FIG. 4, the example systems and processes provide automated audio or video subset network load reduction. Many other variations and additional activities associated with automated audio or video subset network load reduction are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving, at a computing device, a multimedia data stream comprising an audio data stream and a video data stream from a server;
generating an audio output signal for the audio data stream and a video output signal for the video data stream;
detecting, via the computing device, a user interface action that blocks output of one of the audio data stream and the video data stream comprising one of:
detecting a user interface action associated with placement of a graphical user interface (GUI) application window over the output of the video data stream on the display that blocks the output of the video data stream; and
detecting a user interface action associated with a mute request that blocks the output of the audio data stream via the audio output device; and
sending a multimedia traffic reduction request to the server instructing the server to stop transmission of a portion of the multimedia data stream associated with the blocked output of the one of the audio data stream and the video data stream.

2. The method of claim 1, further comprising:
receiving, in response to the multimedia traffic reduction request, a subset of the multimedia data stream comprising only an unblocked subset of the multimedia data stream other than the portion of the multimedia data stream associated with the blocked output of the one of the audio data stream and the video data stream; and
generating only the one of the audio output signal and the video output signal associated with the unblocked subset of the multimedia data stream.

3. The method of claim 1, further comprising:
detecting a use event associated with the blocked output of the one of the audio data stream and the video data stream;
sending a multimedia traffic increase request to the server instructing the server to begin transmission of the portion of the multimedia data stream associated with the blocked output of the one of the audio data stream and the video data stream;
receiving, in response to the multimedia traffic increase request, the multimedia data stream comprising both of the audio data stream and the video data stream; and
restarting generation of the one of the audio output signal and the video output signal associated with the blocked output of the one of the audio data stream and the video data stream.

4. The method of claim 3, where:
the multimedia traffic reduction request comprises one of a NOAUDIO command and a NOVIDEO command; and
the multimedia traffic increase request comprises one of a AUDIONOW command and a VIDEONOW command.

5. A method, comprising:
receiving, at a computing device, a multimedia data stream comprising an audio data stream and a video data stream from a server;
generating an audio output signal for the audio data stream and a video output signal for the video data stream;
detecting, via the computing device, a user interface action that blocks output of the one of the audio data stream and the video data stream comprising detecting, via a light sensor, that one of an audio output device and a video output device associated with the computing device is covered; and
sending a multimedia traffic reduction request to the server instructing the server to stop transmission of a portion of the multimedia data stream associated with the blocked output of the one of the audio data stream and the video data stream.

6. A method, comprising:
automatically enabling a multimedia traffic reduction option based upon one of a configured time threshold for blocked output and a configured processor load threshold associated with the computing device;
receiving, at a computing device, a multimedia data stream comprising an audio data stream and a video data stream from a server;
generating an audio output signal for the audio data stream and a video output signal for the video data stream;
detecting, via the computing device, a user interface action that blocks output of one of the audio data stream and the video data stream; and
sending a multimedia traffic reduction request to the server instructing the server to stop transmission of a portion of the multimedia data stream associated with the blocked output of the one of the audio data stream and the video data stream in response to determining that the multimedia traffic reduction option is enabled.

7. The method of claim 1, further comprising:
prompting a user, via a display associated with the computing device, in response to detection of the user interface action that blocks the output of the one of the audio data stream and the video data stream, with an inquiry for reduction of the multimedia data stream; and
detecting a user input instructing the computing device to reduce the multimedia data stream.

8. A computer program product comprising a computer readable storage medium including computer readable program code, where the computer readable program code when executed on a computer causes the computer to:
receive a multimedia data stream comprising an audio data stream and a video data stream from a server;
generate an audio output signal for the audio data stream and a video output signal for the video data stream;
detect a user interface action that blocks output of one of the audio data stream and the video data stream comprising causing the computer to one of:
detect a user interface action associated with placement of a graphical user interface (GUI) application window over the output of the video data stream that blocks the output of the video data stream; and
detect a user interface action associated with a mute request that blocks the output of the audio data stream; and
send a multimedia traffic reduction request to the server instructing the server to stop transmission of a portion of the multimedia data stream associated with the blocked output of the one of the audio data stream and the video data stream.

9. The computer program product of claim 8, where the computer readable program code when executed on the computer further causes the computer to:
receive, in response to the multimedia traffic reduction request, a subset of the multimedia data stream comprising only an unblocked subset of the multimedia data stream other than the portion of the multimedia data stream associated with the blocked output of the one of the audio data stream and the video data stream; and
generate only the one of the audio output signal and the video output signal associated with the unblocked subset of the multimedia data stream.

10. The computer program product of claim 8, where the computer readable program code when executed on the computer further causes the computer to:
detect a use event associated with the blocked output of the one of the audio data stream and the video data stream;
send a multimedia traffic increase request to the server instructing the server to begin transmission of the portion of the multimedia data stream associated with the blocked output of the one of the audio data stream and the video data stream;
receive, in response to the multimedia traffic increase request, the multimedia data stream comprising both of the audio data stream and the video data stream; and
restart generation of the one of the audio output signal and the video output signal associated with the blocked output of the one of the audio data stream and the video data stream.

11. The computer program product of claim 10, where:
the multimedia traffic reduction request comprises one of a NOAUDIO command and a NOVIDEO command; and
the multimedia traffic increase request comprises one of a AUDIONOW command and a VIDEONOW command.

12. A computer program product comprising a computer readable storage medium including computer readable program code, where the computer readable program code when executed on a computer causes the computer to:
receive a multimedia data stream comprising an audio data stream and a video data stream from a server;
generate an audio output signal for the audio data stream and a video output signal for the video data stream;
detect a user interface action that blocks output of the one of the audio data stream and the video data stream, comprising causing the computer to detect, via a light sensor, that one of an audio output device and a video output device associated with the computer is covered; and
send a multimedia traffic reduction request to the server instructing the server to stop transmission of a portion of the multimedia data stream associated with the blocked output of the one of the audio data stream and the video data stream.

13. A computer program product comprising a computer readable storage medium including computer readable program code, where the computer readable program code when executed on a computer causes the computer to:
automatically enable a multimedia traffic reduction option based upon one of a configured time threshold for blocked output and a configured processor load threshold;

receive a multimedia data stream comprising an audio data stream and a video data stream from a server;
generate an audio output signal for the audio data stream and a video output signal for the video data stream;
detect a user interface action that blocks output of one of the audio data stream and the video data stream; and
send a multimedia traffic reduction request to the server instructing the server to stop transmission of a portion of the multimedia data stream associated with the blocked output of the one of the audio data stream and the video data stream in response to determining that the multimedia traffic reduction option is enabled.

14. The computer program product of claim 8, where the computer readable program code when executed on the computer further causes the computer to:
prompt a user, in response to detection of the user interface action that blocks the output of the one of the audio data stream and the video data stream, with an inquiry for reduction of the multimedia data stream; and
detect a user input instruction to reduce the multimedia data stream.

* * * * *